US008676715B2

(12) United States Patent
Cordery et al.

(10) Patent No.: US 8,676,715 B2
(45) Date of Patent: Mar. 18, 2014

(54) SYSTEM AND METHOD FOR AUTHENTICATING INDICIA USING IDENTITY-BASED SIGNATURE SCHEME

(75) Inventors: Robert A. Cordery, Danbury, CT (US); Matthew J. Campagna, Ridgefield, CT (US); Bertrand Haas, New Haven, CT (US); Bradley R. Hammell, Fairfield, CT (US); Leon A. Pintsov, West Hartford, CT (US); Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 1148 days.

(21) Appl. No.: 11/810,488

(22) Filed: Jun. 6, 2007

(65) Prior Publication Data

US 2008/0306885 A1 Dec. 11, 2008

(51) Int. Cl.
*G06Q 20/00* (2012.01)

(52) U.S. Cl.
USPC .......... 705/60; 705/61

(58) Field of Classification Search
USPC .......... 705/60, 61, 62
See application file for complete search history.

(56) References Cited

U.S. PATENT DOCUMENTS

| | | | | |
|---|---|---|---|---|
| 5,586,036 A * | 12/1996 | Pintsov | | 705/408 |
| 6,711,680 B1 * | 3/2004 | Cordery | | 713/176 |
| 7,003,117 B2 | 2/2006 | Kacker et al. | | |
| 7,113,594 B2 | 9/2006 | Boneh et al. | | |
| 2004/0128254 A1 * | 7/2004 | Pintsov | | 705/62 |

OTHER PUBLICATIONS

Boneh, D. and Franklin, M.; "Identity-Based Encryption from the Weil Pairing," SIAM Journal of Computing, vol. 32, No. 3, pp. 586-615, 2003.
Information Based-Indicia Program (IBIP) Performance Criteria for Information-Based Indicia and Security Architecture for closed IBI Postage Metering Systems (PCIBI-C), United States Postal Service, Jan. 12, 1999.
Closed Postage Payment System Key Management Plan, United States Postal Service, Feb. 13, 1998.
United States Postal Service—Information-Based Indicia Program (IBIP)—Performance Criteria for Information-Based Indicia and Security Architecture for Closed IBI Postage Metering Systems, Jan. 12, 1999, XP-002138350.
Boneh et. al., Identity-Based Encryption from the Weil Pairing—21st Annual International Conference, Aug. 2001, XP-002256845.
Xiangguo, Cheng et. al.—An Identity-Based Signature and Its Threshold Version—Proceedings of the 19th International Conference on Advanced Information Networking and Applications (AINA '05)—XP010789935.

* cited by examiner

*Primary Examiner* — Chrystina Zelaskiewicz
(74) *Attorney, Agent, or Firm* — Brian A. Lemm; Charles R. Malandra, Jr.; Steven J. Shapiro

(57) ABSTRACT

Methods and systems for verification of indicia that do not require key management systems, and in which revocation of key pairs is easily performed without adding costs to the verification process are provided. Indicia are generated and authenticated utilizing an identity-based encryption (IBE) scheme. A key generating authority generates a private key for a PSD, distributes the private key securely to the PSD, and provides public information for use by a verification service when verifying cryptographic digital signatures generated with the private key. The corresponding public key is a string consisting of PSD information that is provided as part of the indicium. The verification service can verify the signature of each indicium by obtaining the public key string from the indicium, and utilizing the key generating authority's public information.

12 Claims, 3 Drawing Sheets

SYSTEM AND METHOD FOR AUTHENTICATING INDICIA USING IDENTITY-BASED SIGNATURE SCHEME

FIELD OF THE INVENTION

The invention disclosed herein relates generally to postal systems, and more particularly to methods and systems for authenticating indicia provided as evidence of payment for delivery of mail pieces using an identity-based signature scheme.

BACKGROUND OF THE INVENTION

Mailing systems for printing postage indicia on envelopes and other forms of mail pieces have long been well known and have enjoyed considerable commercial success. There are many different types of mailing systems, ranging from relatively small units that handle only one mail piece at a time, to large, multi-functional units that can process hundreds of mail pieces per hour in a continuous stream operation. The larger mailing systems often include different modules that automate the processes of producing mail pieces, each of which performs a different task on the mail piece. The mail piece is conveyed downstream utilizing a transport mechanism, such as rollers or a belt, to each of the modules. Such modules could include, for example, a singulating module, i.e., separating a stack of mail pieces such that the mail pieces are conveyed one at a time along the transport path, a moistening/sealing module, i.e., wetting and closing the glued flap of an envelope, a weighing module, and a metering module, i.e., applying evidence of postage to the mail piece. The exact configuration of the mailing system is, of course, particular to the needs of the user.

Typically, a control device, such as, for example, a microprocessor, performs user interface and control functions for the mailing system. Specifically, the control device provides all user interfaces, executes control of the mailing system and print operations, calculates postage for debit based upon rate tables, provides the conduit for the Postal Security Device (PSD) to transfer information defining postage indicia or a digital postage mark (DPM) to the printer, operates with peripherals for accounting, printing and weighing, and conducts communications with a data center for postage funds refill, software download, rates download, and market-oriented data capture. The control device, in conjunction with an embedded PSD, constitutes the system meter that, for example, satisfies U.S. information-based indicia program (IBIP) meter requirements and other international postal regulations regarding meters. The United States Postal Service (USPS) initiated the Information-Based Indicia Program (IBIP) to enhance the security of postage metering by supporting new methods of applying postage to mail. The USPS has published draft specifications for the IBIP. The requirements for a closed system are defined in the "Performance Criteria for Information-Based Indicia and Security Architecture for Closed IBI Postage Metering System (PCIBI-C)," dated Jan. 12, 1999. A closed system is a system whose basic components are dedicated to the production of information-based indicia and related functions, similar to an existing, traditional postage meter. A closed system, which may be a proprietary device used alone or in conjunction with other closely related, specialized equipment, includes the indicia print mechanism.

The PCIBI-C specification defines the requirements for the indicium to be applied to mail produced by closed systems. The indicium consists of a two-dimensional (2D) barcode and certain human-readable information. Some of the data contained in the barcode includes, for example, the PSD manufacturer identification, PSD model identification, PSD serial number, values for the ascending register (the total monetary value of all indicia ever produced by the PSD) and descending register (the postage value remaining on the PSD) of the PSD at the time of printing, postage amount, and date of mailing. In addition, a cryptographic digital signature is required to be created by the PSD for each mail piece and placed in the digital signature field of the barcode. Several types of digital signature algorithms are supported by the IBIP, including, for example, the Digital Signature Algorithm (DSA), the Rivest Shamir Adleman (RSA) Algorithm, and the Elliptic Curve Digital Signature Algorithm (ECDSA). Each of the supported digital signature algorithms implements a "public key" cryptographic algorithm for the digital signature function. Public-key cryptosystems allow two parties to exchange private and authenticated messages without requiring that they first have shared a private (symmetric) key in a secure fashion. A public-key cryptosystem utilizes a unique pair of keys: a private key that is a secret and a public key that is widely known and can be obtained and used by any party without restrictions. This pair of keys has two important properties: (1) the private key cannot be deduced from knowledge of the public key and the message, and (2) the two keys are complementary, i.e., a message encrypted with one key of the pair can be decrypted only with the other (complementary) key of the pair. As described in the PCIBI-C specification, the PSD internally derives the private/public key pair. Both the public and private key are stored in nonvolatile memory in the PSD. The public key is then provided to a certificate authority, which generates a certificate for the public key that verifies the authenticity of the public key. The certificate is returned to the PSD, which compares the stored public key with the public key included in the certificate. If the comparison is successful, the certificate for the public key is stored by the PSD.

The PSD then utilizes the private key to cryptographically sign indicia, which evidences payment of postage, produced by the PSD. The digital signature allows the postal service to authenticate each indicium, and provides assurance that proper accounting has been performed and payment has been made for delivery of a mail piece. To authenticate each indicium, the postal service utilizes the public key, in conjunction with the certificate for the public key, to verify the digital signature of the indicium. Accordingly, the postal service requires access to the appropriate public key corresponding to the signature, along with the certificate for the public key. One way to provide suitable access would be to include the public key and corresponding certificate on the face of each mail piece along with the indicium. Because of the size and complexity of the public key and certificate, this is difficult and costly to do. Another way to provide suitable access is by providing suitable key management, in which the manufacturer of the PSDs provides the public keys and certificates for its PSDs to the postal service. This can be performed, for example, using electronic or physical means. The postal service must then maintain a suitable repository of each of the public keys for use in verifying indicia (i.e., when the public keys must be retrieved from the repository). Each of these, however, adds significant costs for both the PSD manufacturer and postal service with respect to record keeping and infrastructure to support such key management. Another problem with such systems is lack of, or expense of maintaining, a managed certificate or public key revocation system. The PSD manufacturer will, from time to time, revoke a current set of keys being used (due to, for example, a possible security breach). Ideally, when verifying an indicium the postal service will ensure that the key pair used for the indicium has not been revoked. This, however, also adds additional costs to the verification process, and in many cases the revocation check is not performed.

Thus, there exists a need for methods and systems for authenticating indicia that do not conventional and expensive require key management systems, and in which revocation of key pairs is easily performed without adding costs to the authentication process.

SUMMARY OF THE INVENTION

The present invention alleviates the problems associated with the prior art and provides methods and systems for authentication of indicia that do not require key management systems, and in which revocation of key pairs is easily performed without adding costs to the authentication process. According to embodiments of the invention, indicia are generated and authenticated utilizing an identity-based encryption (IBE) scheme. A key generating authority generates a private key for a PSD, distributes the private key securely to the PSD, and provides public information for use by a verification service when verifying cryptographic digital signatures generated with the private key. The PSD generates a signature for an indicium using the private key provided by the key generating authority. The corresponding public key is a string consisting of PSD information, including, for example, PSD serial number, values for the ascending and descending registers of the PSD (also referred to as a control total), mail piece origin zip code, future date of PSD inspection, etc. that is provided as part of the indicium. The verification service, e.g., a postal service, can verify the signature of each indicium by obtaining the public key string from the indicium, and utilizing the key generating authority's public information. By utilizing the present invention, each indicium is self-authenticating and provides the same levels of security as a public-key system that utilizes a certificate, but without the need for a certificate, and therefore without the need for extensive key management systems. A further benefit is that the private key can be routinely updated, thus reducing potential exposure in the event of a key compromise. Because the keys can have very limited validity periods, the need for a revocation system is significantly reduced or completely eliminated depending on the security policy and risk tolerance of the verification authority.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PREFERRED EMBODIMENTS

Figure 1:
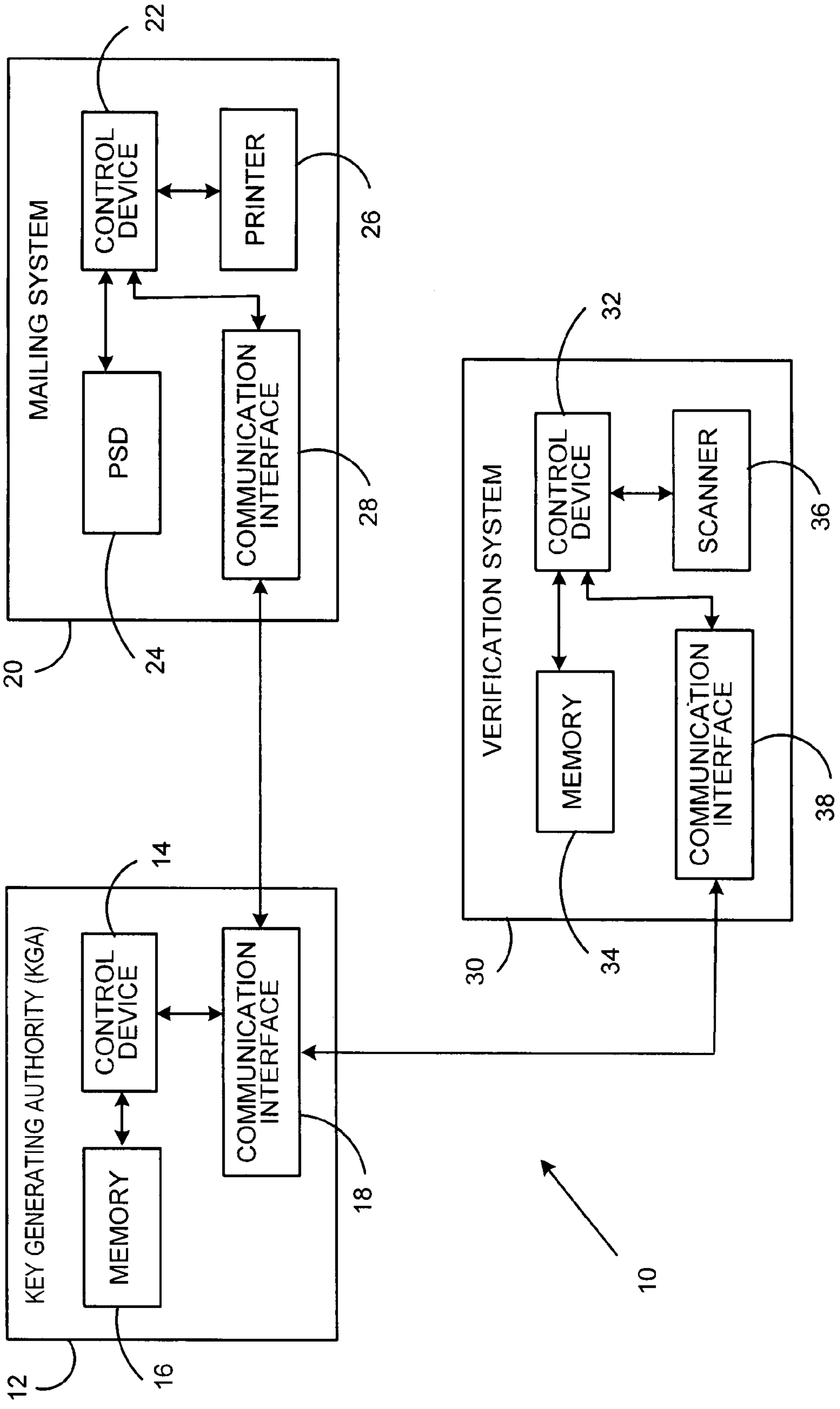
FIG. 1 illustrates in block diagram form a system for authenticating indicia provided as evidence of payment for delivery of mail pieces using an identity-based signature scheme according to embodiments of the present invention.

In describing the present invention, reference is made to the drawings, where there is seen in FIG. 1 in block diagram form a system 10 for generating and authenticating indicia according to an embodiment of the present invention. The system 10 includes key generating authority (KGA) 12, mailing system 20, and verification system 30. It should be understood that while only a single mailing system 20 and verification system 30 are illustrated, a plurality of such elements may also be provided. KGA 12 includes a control device 14, which may be, for example, a special or general purpose processing device or the like, a memory 16, and a communication interface 18. Mailing system 20 includes a control device 22, which may be, for example, a special or general purpose processing device of the like, a Postal Security Device (PSD) 24, a printing device 26, and a communication interface 28. PSD 24 preferably includes, for example, a secure storage area, e.g., memory, that is used to store cryptographic keys, ascending and descending register values, inspection dates, and other information. The PSD 24 can also include a secure processor for performing cryptographic operations. The verification system 30 includes a control device 32, which may be, for example, a special or general purpose processor or the like, a memory device 34, a scanning device 36 and a communication interface 38. KGA 12, as further described below, generates a private cryptographic key for use by the PSD 24 and provides public key information to the verification system 30. The PSD 24 accounts for and generates an indicium, which is provided with an identity-based cryptographic digital signature utilizing the private key. The indicium is printed on a mail piece. The verification system 30 can then authenticate the indicium by verifying the identity-based digital signature utilizing the public key information provided by the KGA12 along with the identity information obtained from the mail piece via scanning device 36.

The present invention utilizes an identity-based cryptographic scheme to provide cryptographic digital signatures used to authenticate the indicia generated by the PSD 24 of mailing system 20. In one particular type of public-key cryptosystem, keys can be computed from a standardized identifier or identifiers, which need not be secret, associated with the PSD 24 that is invariant for at least the life of the current private key. Such identifiers (also referred to as public identifiers) can include, for example, the PSD's unique identification, the name of the PSD manufacturer, the current control total value (sum of ascending and descending registers) of the PSD, the next scheduled inspection date of the PSD, etc. Because the public key is a value of a publicly known function of only pre-existing public identifiers rather than a key produced from a random seed, this kind of public-key cryptosystem is called an identity-based encryption (IBE) scheme. One implementation of an IBE scheme is described in detail in U.S. Pat. No. 7,113,594, issued Sep. 26, 2006, the disclosure of which is incorporated herein by reference.

The preferred IBE scheme utilized to implement the present invention is described in detail in the aforementioned U.S. Pat. No. 7,113,594, although other similar IBE schemes may also be used. The preferred IBE scheme utilizes public keys that each consists of an arbitrary string derived from one or more identity parameters for the PSD that generates the indicium.

Figure 2:
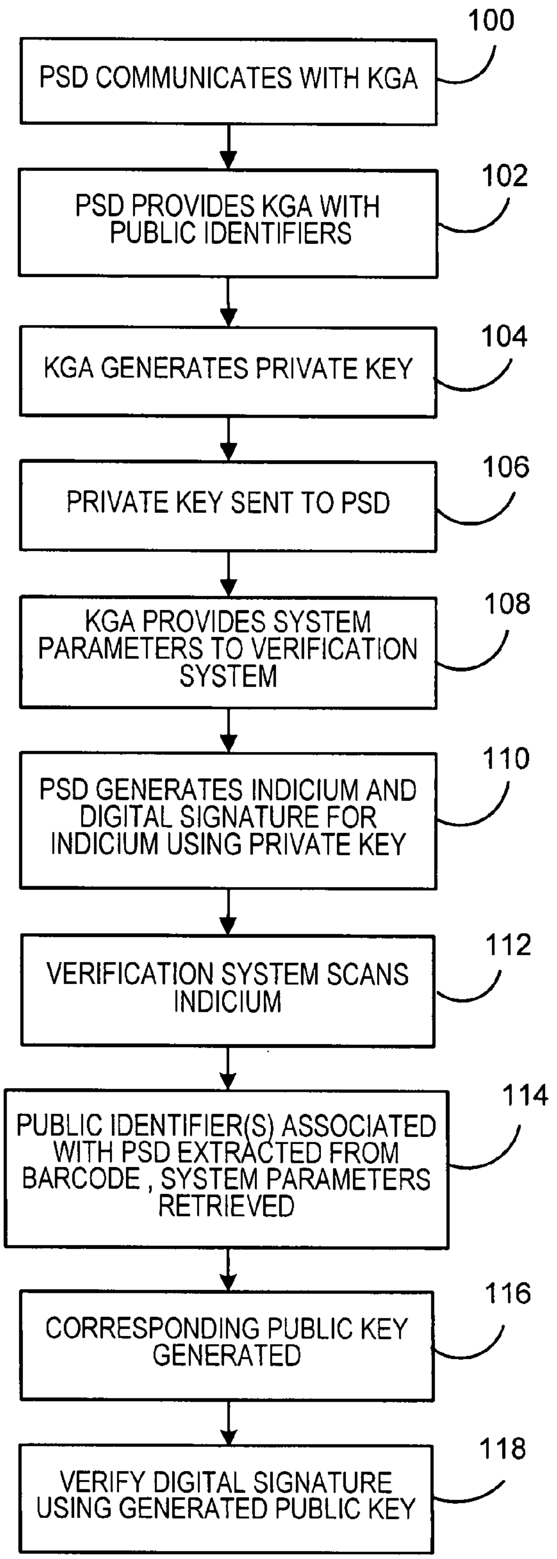
FIG. 2 illustrates in flow diagram form the operation of the system of FIG. 1 according to an embodiment of the present invention.

FIG. 2 illustrates in flow diagram form the operation of the system of FIG. 1 according to an embodiment of the present invention. In step 100, the mailing system 20 communicates with the KGA 12 via communication interfaces 28 and 18, to exchange information as described below. Preferably, the communication link formed by communication interfaces 18 and 28 is a secure link to prevent unauthorized access to information being sent between the KGA 12 and mailing system 20. Such communication can occur upon initialization of the mailing system 20, when a new private key is to be generated and provided to PSD 24, or at any other intervals as desired. In step 102, the PSD 24 provides the KGA 12 with certain information, referred to above as public identifiers, which are associated with and preferably uniquely indicative of the PSD 24. Such public identifiers could include, for example, unique identification information including the model number of the PSD 24, a serial number of the PSD 24, the manufacturer name of the PSD 24, the current control total value of the PSD 24, and a future inspection date for PSD 24, i.e., the date by which the PSD 24 must make contact with either the manufacturer or other postage procurement network. As is known, most postal services require that meters, e.g., PSD 24, communicate with either the manufacturer or some other postage procurement network on a regular basis to simplify tracking of usage and help prevent fraudulent use of the PSD 24. In most instances, lock-out timers are required to prevent operation of the PSD 24 if such regular communication is not made. As such, each PSD 24 will have stored therein a date by which the PSD 24 must next communicate with the manufacturer or postage procurement network. Upon successful communication, this date is updated to a subsequent future date, e.g., 60 or 90 days, by which the PSD 24 must again communicate. It should be understood that the public identifiers for the PSD 24 can include one or more of the above items, other information as desired, or can be a concatenation of a combination of any of the above items.

In step 104, KGA 12, utilizing the public identifiers provided by the PSD 24, generates a private key for use by the PSD 24. More specifically, KGA 12 performs a setup procedure to generate a master secret parameter and system parameters associated with the specific cryptographic algorithm utilized to generate digital signatures. The master secret parameter includes, for example, some integer known only to KGA 12. The system parameters include, for example, in the case of ECDSA, elliptic curve parameters on the curve required by the cryptographic algorithm, and are made publicly available for use as described below. The master secret parameter and system parameters can be stored in the memory 16. The control device 14 of KGA 12 uses the public identifier(s) associated with PSD 24, along with the master secret parameter stored in memory 16, to generate a private cryptographic key for the PSD 24 that corresponds to a public key that is based on the public identifier(s) associated with the PSD 24. Optionally, for added security, additional information, such as, for example, a random number known only to KGA 12 and verification system 30, could be added to the public identifier(s) associated with PSD 24 before the private key is generated by the KGA 12. In step 106, KGA 12 sends the generated private key to PSD 24, where it is stored in the secure memory (not shown) of the PSD 24. In step 108, KGA 12 provides the system parameters associated with the specific cryptographic algorithm utilized to generate digital signatures to the verification system 30 utilizing, for example, the communication interfaces 18 and 38. The system parameters are preferably stored by the verification system in the memory 34. It should be understood that step 108 need not be performed each time a new private key is generated, since the system parameters do not need to change each time a new key is generated. Preferably, the system parameters need only to be sent to the verification system 30 one time and only updated when the system parameters are changed by the KGA 12.

Figure 3:
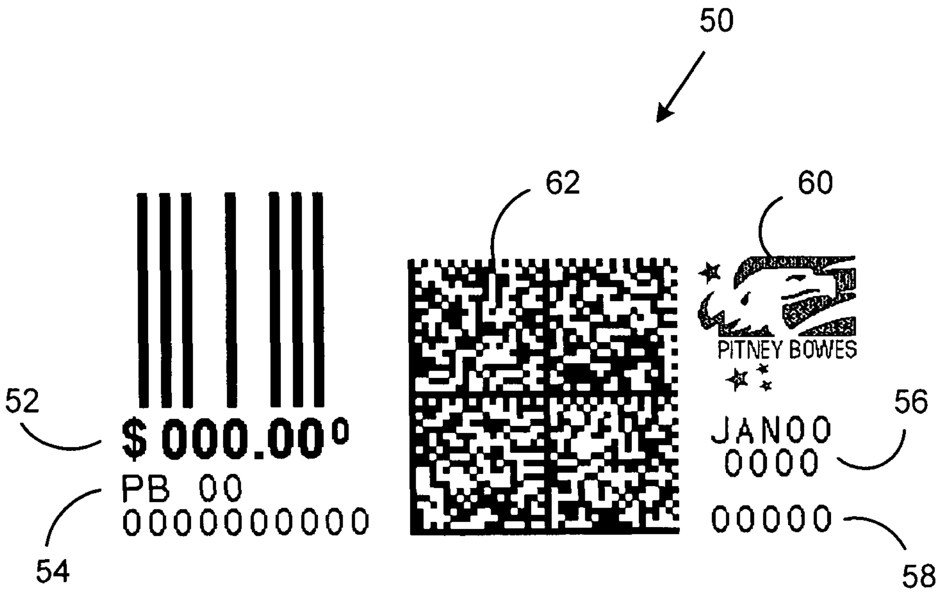
FIG. 3 illustrates an example of an indicium generated and authenticated by the system of FIG. 1.

In step 110, the PSD 24, during processing of mail pieces by the mailing system 20, generates an indicium that evidences payment of postage for a mail piece and generates a cryptographic digital signature for the indicium using the private key received from KGA 24. FIG. 3 illustrates an example of an indicium 50 that may be generated by PSD 24 and printed on a mail piece using the printer 26. As shown in FIG. 3, indicium 50 includes human readable information, e.g., postage amount 52, meter identification 54, date 56, and origin zip code 58, a graphic image 60, and machine readable information, e.g., barcode 62. Barcode 62 contains indicium information that can include, for example, the public identifier(s) for PSD 24 (model number of the PSD 24, a serial number of the PSD 24, the manufacturer name of the PSD 24, the current ascending and descending register values of the PSD 24, and the date by which the PSD 24 must make contact with either the manufacturer to other postage procurement network), the postage amount, the origin postal code, current date, piece count, and the cryptographic digital signature of the indicium. Optionally, the barcode 62 can also include an error correction code. The mail piece is then provided to a delivery service, such as a postal service or other type of carrier, for delivery.

As previously noted, the digital signature included in the barcode 62 of indicium 50 allows authentication of each indicium 50, and provides assurance that proper accounting has been performed and payment has been made for delivery of a mail piece. Authentication of an indicium 50 is performed by the verification system 30, which may be operated by a postal service or other entity, including, for example, the manufacturer of the mailing system 20. In step 112, the verification system 30 scans the indicium 50 on the mail piece using the scanner 36 to obtain the information from the barcode 62. In step 114, the control device 32 extracts the public identifier(s) associated with the PSD 24 from the obtained information, and retrieves the system parameters previously stored in memory 34. Utilizing the public identifier(s) associated with PSD 24 (and any additional information provided for added security, if utilized) and the system parameters provided by the KGA 12, the control unit 32 of verification system 30 can then in step 116 generate the corresponding public key for the private key used by the PSD 24. In step 118, the control unit 32 can verify the digital signature included in the barcode 62 using the generated public key and conventional public key cryptosystem verification techniques. If the digital signature passes the verification test, this provides evidence of the authenticity of the indicium, and provides assurance that proper accounting has been performed and payment has been made for delivery of the mail piece. If the digital signature verification fails, this indicates that the indicium is potentially a fraudulent indicium, and that proper accounting may not have been performed and payment not made for delivery of the mail piece. Since the verification system 30 is able to generate the corresponding public key from information associated with the PSD 24, the verification system 30 does not need to receive the public key from the mailing system 20 or KGA 12, and therefore does not need to maintain any type of repository to store received public keys. Additionally, there is no need for any type of certificate to ensure the authenticity of the public key. Thus, according to embodiments of the present invention, the key management systems required in conventional verification systems are no longer necessary, without any loss of security of the verification system.

As noted above, the public identifier(s) associated with PSD 24 can include the future inspection date for PSD 24. Thus, the key pair used for the cryptographic digital signature will change each time a new inspection date occurs. By utilizing the inspection date as one of the public identifiers, the exposure of a compromised meter is limited to the duration of the time between inspection dates, which is controllable by the verification authority. Thus, for example, if the private key for PSD 24 is compromised and being fraudulently used to sign indicia, the potential amount of fraudulent use is limited as the private key (and corresponding public key) will change when the next inspection date occurs. Thus, the previous private key will no longer be valid, and any indicia that are signed using the previous private key will no longer pass the authentication process. There is, therefore, no need for any type of revocation system, as the keys will automatically be changed, i.e., revoked, at predetermined intervals. Additionally, if a suspected breach of the private key for PSD 24 occurs, the KGA 12 can change the private key for the PSD 24 at any time by changing the public identifier(s) associated with PSD 24 used to generate the private key. The barcode 62 can indicate the public identifiers that should be used by the verification system 30 when generating the public key to verify the digital signature. Thus, there is again no need for any type of revocation system or revocation check required to be performed by the verification system 30.

Thus, according to the present invention, methods and systems for authentication of indicia that do not require key management systems, and in which revocation of key pairs is easily performed without adding costs to the authentication process are provided. While preferred embodiments of the invention have been described and illustrated above, it should be understood that these are exemplary of the invention and are not to be considered as limiting. For example, while the above description is related to postage systems, the present invention is not so limited and can be utilized with any type of metering systems in which indicia are generated to evidence a transaction. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for a verification system to authenticate an indicium generated by a metering device, the indicium including identification information associated with the metering device and a digital signature generated using a private key, the method comprising:

scanning the indicium using a scanner of the verification system to obtain the identification information included in the indicium;

generating a public key using a processing device of the verification system, the public key corresponding to the private key used for generating the digital signature, the processing device utilizing at least a portion of the identification information obtained from the indicium and public identifiers previously stored in a memory device and not utilizing any random seed value to generate the public key; and verifying, using the processing device of the verification system, the digital signature using the generated public key, wherein if the digital signature is successfully verified, the indicium is authenticated, and if the digital signature is not successfully verified, the indicium is not authenticated.

2. The method according to claim 1, wherein the identification information includes at least one of a model number of the metering device, a serial number of the metering device, and a total of one or more registers maintained in the metering device.

3. The method according to claim 2, wherein the identification information further includes an inspection date for the metering device.

4. The method according to claim 1, wherein the identification information is a concatenation of any combination of a model number of the metering device, a serial number of the metering device, a total of one or more registers maintained in the metering device, and an inspection date for the metering device.

5. The method according to claim 1, wherein the digital signature is generated using the private key and a cryptographic algorithm, and verifying the digital signature further comprises:

retrieving at least one parameter associated with the cryptographic algorithm; and verifying the digital signature using the generated public key and the at least one parameter associated with the cryptographic algorithm.

6. The method according to claim 1, wherein the metering device is a postage meter and the indicium evidences payment of postage for a mail piece.

7. A system for authenticating an indicium generated by a metering device, the indicium including identification information associated with the metering device and a digital signature generated using a private key, the system comprising:

a scanning device that scans the indicium to obtain the identification information included in the indicium;

a processing device that generates a public key that corresponds to the private key used for generating the digital signature utilizing at least a portion of the identification information obtained from the indicium and public identifiers previously stored in a memory device and not utilizing any random seed value; and the processing device that verifies the digital signature using the generated public key, wherein if the digital signature is successfully verified, the indicium is authenticated, and if the digital signature is not successfully verified, the indicium is not authenticated.

8. The system according to claim 7, wherein the identification information includes at least one of a model number of the metering device, a serial number of the metering device, and a total of one or more registers maintained in the metering device.

9. The system according to claim 8, wherein the identification information further includes an inspection date for the metering device.

10. The system according to claim 7, wherein the identification information is a concatenation of any combination of a model number of the metering device, a serial number of the metering device, a total of one or more registers maintained in the metering device, and an inspection date for the metering device.

11. The system according to claim 7, wherein the digital signature is generated using the private key and a cryptographic algorithm, and the processing device retrieves at least one parameter associated with the cryptographic algorithm; and verifies the digital signature using the generated public key and the at least one parameter associated with the cryptographic algorithm.

12. The system according to claim 7, wherein the metering device is a postage meter and the indicium evidences payment of postage for a mail piece.

* * * * *